United States Patent
Alvarez-Gallego et al.

(10) Patent No.: US 6,869,715 B2
(45) Date of Patent: Mar. 22, 2005

(54) ION CONDUCTIVE MEMBRANE FOR ELECTROCHEMICAL APPLICATION

(75) Inventors: Yolanda Alvarez-Gallego, Geesthacht (DE); Suzana Pereira Nunes, Geesthacht (DE); Kai Jakoby, Düsseldorf (DE); Javier de Abajo, Madrid (ES)

(73) Assignee: GKSS-Forschungszentrum Geesthacht, GmbH, Geesthacht (DE)

(*) Notice: Subject to any disclaimer, the term of this patent is extended or adjusted under 35 U.S.C. 154(b) by 299 days.

(21) Appl. No.: 10/303,072

(22) Filed: Nov. 23, 2002

(65) Prior Publication Data

US 2004/0101732 A1 May 27, 2004

(51) Int. Cl.$^7$ .................................................. H01M 8/10
(52) U.S. Cl. .............................. 429/33; 429/30; 429/40
(58) Field of Search ................................ 429/30, 33, 40

(56) References Cited

U.S. PATENT DOCUMENTS 5,886,131 A * 3/1999 Yao et al. .................... 528/185
5,939,520 A * 8/1999 Langsam ..................... 528/350

FOREIGN PATENT DOCUMENTS

JP  63-28424  *  2/1988  ........... B01D/53/22

* cited by examiner

*Primary Examiner*—Dah-Wei Yuan
(74) *Attorney, Agent, or Firm*—Klaus J. Bach

(57) ABSTRACT

An ion conductive membrane for electrochemical applications is provided for forming the membrane on the basis of a polyimide or copolyimide polymer, which contains in its structure heterocyclic groups, particularly in the form of imidazole-, pyridin or pyrimidin groups. The electrochemical applications include particularly the use of such membranes in fuel cells.

8 Claims, No Drawings

ION CONDUCTIVE MEMBRANE FOR ELECTROCHEMICAL APPLICATION

BACKGROUND OF THE INVENTION

The invention relates to an ion-conductive membrane for electrochemical applications on the basis of an aromatic polyimide- and co-polyimide polymer and its use.

Fuel cells are presently the subject of intense development work since they are promising alternatives for energy conversion. For mobile applications, the so-called polyelectrolyte membrane fuel cell (PEFC) has been found to be particularly suitable, see F. R. Kalhammer, P. R. Prokopius, V. P. Roan, G. E. Voecks, Status and Prospects of Fuel Cells as Automobile Engines, State of California Air Research Board, 1998. An essential criterion for bringing this technology to the market is the availability of suitable membranes with high proton conductivity, a low fuel, or respectively, energy carrier permeability (hydrogen or methanol) and a high chemical stability. Such membranes however must also be relatively inexpensive.

For fuel cells, so far, so called Nafion® membranes which are fluorinated membranes from DuPont or similar, membranes from Dow and Asahi have been commercially available and have been widely used. (O. Savadogo, J. New Materials for Electrochemical Systems 1 (1998) 47).

An essential disadvantage of these Nafion® membranes however is their price. Therefore various non-fluorinated membranes have been tested in the last years. Most of them are based on sulfonated polymers and copolymers. Membranes of sulfonated polysulfon, sulfonated polyether ketone, sulfonated polyphosphene and sulfonated polyamides are described in various publications, see Q Guo, P. N. Pintauro, H. Tang, S. O'Connor, Sulfonated and cross-linked polyphosphazene-based proton exchange membranes, J. Membrane Sci. 154 (1999) 175, E. Vallejo, G. Pourcelli, C. Gavach, R. Mercier and M. Pineri, Sulfonated polyimides as proton conductor exchange membranes. Physicochemical properties and separation $H^+/Mz^+$ by electrodialysis comparison with a perfluorosulfonic membrane, J. Membrane Sci. 160 (1999) 127; S. Faure, M. Pineri, P. Aldebert, R. Mercier, B. Sillion, U.S. Pat. No. 6,245,881 B1.

A further disadvantage of the Nafion® membranes resides in the loss of proton conductivity at temperatures above 100° C., because of the removal of water. However, operation at 100–150° C. would be advantageous in order to reduce the poisoning of the catalyst by CO. A polymer which is believed to be usable in this temperature range is polybenzimidazole, which is usually doped with phosphoric acid (R. F. Savinell, M. H. Litt, Protein conducting polymers prepared by direct acid casting, U.S. Pat. No. 5,716,727).

Polybenzimidazole (PBI) has also been modified by sulfonizing in order to increase the conductivity below 100° C. (D. J. Jones and J. Roziere, Recent advances in the functionalisation of polybenzimidazole and polyether ketone for fuel applications, J. Membrane Sci. 185 (2001) 41). The basic character of the imidazole groups plays in this case an essential role in the transport of protons in PBI membranes and in their good performance above 100° C.

Also sulfonated polyimides have already been examined for use in fuel cells (C. Genies, R. Mercier, B. Sillion, N. Cornet, G. Gebel, M. Pineri; Soluble sulfonated napthalenic polyimides as materials for proton exchange membranes, Polymer 42 (2001) 359–373; C. Genies, R. Mercier, B. Sillion, R. Petiaud, N. Cornet, G. Gebel, M. Pineri. Stability study of sulfonated phtalic and naphtalenic polyimide structures in aqueous medium. Polymer 42(2001) 5097–5105). The possibilities for synthesis are very flexible and a multitude of structures can be obtained. However, the membranes examined so far are inadequate in many respects.

It is the object of the present invention to provide an improved membrane, which can be used for electrochemical applications, particularly in connection with fuel cells.

SUMMARY OF THE INVENTION

An ion conductive membrane for electrochemical applications is provided for forming the membrane on the basis of a polyimide or copolyimide polymer, which contains in its structure heterocyclic groups, particularly in the form of imidazole-, pyridin or pyrimidin groups. The electrochemical applications include particularly the use of such membranes in fuel cells.

The polyimide or, respectively, copolyimide polymers include units which may be same or different but which correspond to the following general formula.

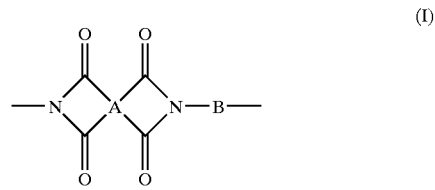

In this general formula I, the rest B represents at least one, possibly substituted, aromatic heterocycle of the following general formula II

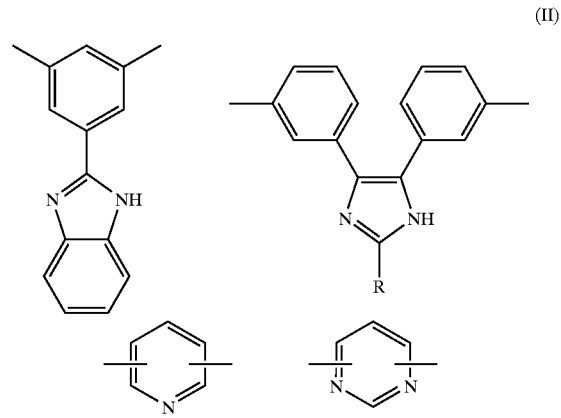

Here, the rest R represents a hydrogen atom, a phenyl rest, a phosphoric acid group or a chain containing at least one phosphoric and group.

The group A in the general formula I represents one of the following, at least one naphthalene unit containing, groups of the general formula III:

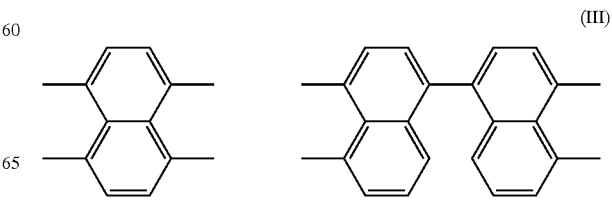

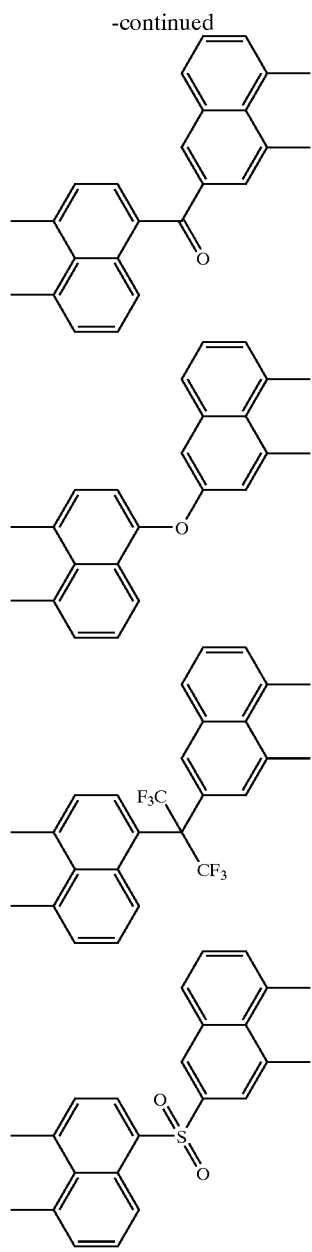

The group A forms with the neighboring imide groups (see the general formula I) rings with 6 atoms.

Preferably, the polymers, of which the membranes according to the invention consist, comprise recurring units of the general formula I.

The polymers used for the manufacture of the membrane according to the invention are provided preferably by a direct conversion of diamines (particularly 4,5-di(3-aminophenyl)imidazole and 5-(2-benzimidazole)-1.3-phenylenedianine, diaminopyridines and/or diaminopyrimidines with naphthaline-1, 4, 5, 8 tetracarbonic acid dianhydride (NTCDA) or bis(napthaline (NTCDA) or bis (napthaline acid anhydrides) as well as the diacid-dialkylester- or dialcylchloride-dialkylester derivatives of these dianhydrides.

The polymer may further be modified by the introduction of other groups, such as acids generally and particular phosphoric acid groups which, among others, can increase the photon conductivity. The membranes are manufactured preferably by casting the solution of the polymers. It is also possible to modify the membranes with acids or other organic substances, for example, with phosphates in order to improve the conductivity.

The invention will be explained below in greater detail on the basis of examples which represent preferred embodiments.

EXAMPLE 1

A 250 ml three-necked flask provided with a mechanical stirrer, an inlet for an inert gas (argon) and a Dean-Stark system with a cooler and a dry tube at its tip, was charged with 0.4365 g (4 mmol) 2.6-diaminopyridine, 1.601 g (8 mmol) bis-(4-aminophenyl)-ether, 3.2182 g (12 mmol) napthalene-1,4,5,8 tetra carbonic acid dianhydride, 7.82 g (64 mmol benzoic acid and 45 g m-kresol. This mixture (dark red solution) was heated in a thermostatically controlled silicon oil bath for 8 hours at 80° C. and for 24 hours at 190° C. while being stirred. Then 10 g m kresol were added and the reaction mixture was cooled to room temperature and poured into ethylacetate. The light brown precipitate was filtered out, washed with ethylacetate and then with ethanol and was dried in a vacuum at 80° C.

EXAMPLE 2

Into a 100 ml three-necked flask provided with a mechanical stirrer an inlet for an inert gas (argon) and a dry tube, 0.1882 g (1 mmol) 2.4-diaminobenzene sulfonic acid and 0.17 ml (1.2 mmol) dry, triethylamin were introduced and stirred at room temperature for several minutes. Then 0.1091 g (1 mmol) 2,6-diaminopyriden, 0.2007 g (1 mmol) bis-(4-aminophenyl)-ether, 0.80454 g (3 mmol) napthalene 1,4,5,8 tetra carbonic acid dianhydride and 18 g benzoic acid were added. This mixture was heated in a thermostatcially controlled silicone oil bath to 140° C. After the melting of the benzoic acid, the stirrer was activated. The temperature was increased to 160° C. and the mixture was stirred at this temperature overnight. After cooling to room temperature, acetone was added to the mixture in order to dissolve benzoic acid and to remove it subsequently. The light brown residue was filtered out, washed with acetone and dried in a vacuum at 70° C.

EXAMPLE 3

1.7941 g (8 mmol) 5-(2-benzimidazole)-1,3-phenylendiamine, 0.8001 g (4 mmol) bis-(4-aminophenyl)-ether, 3.2182 g (12 mmol) napthalene-1,4,5,8-tetracarbonic acid dianhydride, 2.56 g (21 mmol) benzoic acid and 45 g m-kresol were filled into a 250 ml three-necked flasks. This mixture was heated in a silicon oil bath—while being stirred—to 80° C. for 4 h and for 20 h to 190° C. Then 10 g m-kresol were added and the mixture was cooled to room temperature and poured into ethyl acetate. The precipitate was filtered out, washed with ethyl acetate and then with ethanol and dried in a vacuum at 80° C.

For the manufacture of the membranes according to the invention, a solution of the polymers as prepared in the example 1 to 3 is prepared. The membranes are manufactured in a wellknown manner from this solution by casting.

What is claimed is:

1. An ion conductive membrane, for electrochemical applications, on the basis of an aromatic polyimide or co-polyimide polymer containing the same or different units of the general formula I

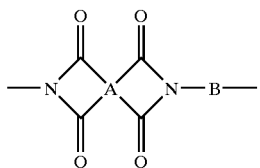

(I)

wherein B is a rest representing at least one aromatic heterocycle of the general formula II

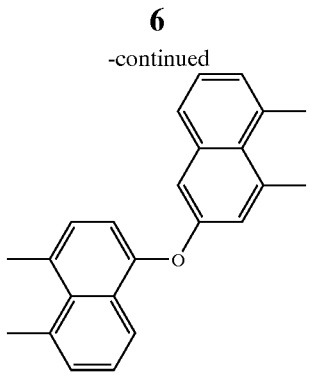

(II)

with R substituted for H representing one of a phenyl rest, a phosphoric acid group and at least one chain containing a phosphoric acid group and A representing one of the following groups containing at least one napthalene unit and having the general formula (III)

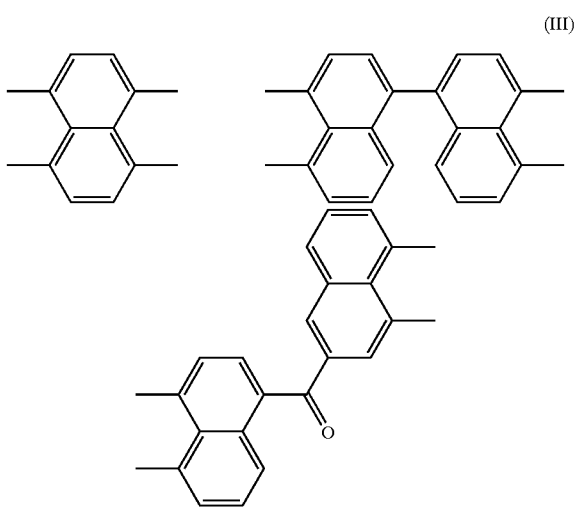

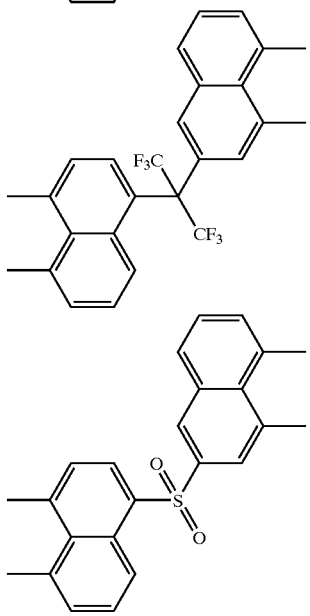

and forming with the neighboring imide groups rings with 6 atoms.

2. A membrane according to claim 1, wherein said polymer is built up from recurring units of the general formula I.

3. A membrane according to claim 1, comprising at least one of the group consisting of diamine, diaminopyridin and diaminopyrimidin, which are reacted with at least one of bis(napthalene-acidanhydride) and a diacid-diakylyester or dialcylchloride-diakylester derivate of the these dianhydrides.

4. A membrane according to claim 3, wherein, as diamin, there is at least one of a 4.5-di(3 amino phenyl)imidazole and 5-(2-benzimidazole)-1.3-phenylendiamin.

5. A membrane according to claim 1, wherein said polymer is modified by introduction of another group, particularly a phosphoric acid group, and the membrane is doped with an acid or an organic modifier.

6. A membrane according to claim 1, wherein said membrane is produced by a casting solution of one of the polyimide and the copolyimide polymer.

7. The use of a membrane as defined in claim 1 for electrochemical application.

8. The use of a membrane as defined in claim 1 for installation in a fuel cell.

* * * * *